United States Patent
Choi et al.

(10) Patent No.: US 6,744,935 B2
(45) Date of Patent: Jun. 1, 2004

(54) CONTENT-BASED IMAGE RETRIEVAL APPARATUS AND METHOD VIA RELEVANCE FEEDBACK BY USING FUZZY INTEGRAL

(75) Inventors: Young-Sik Choi, Seoul (KR); Jin-Han Kim, Seoul (KR); Eun-Il Yoon, Seoul (KR); Sang-Hong Lee, Kyoungki-Do (KR)

(73) Assignee: Korea Telecom, Sungnam-shi (KR)

( * ) Notice: Subject to any disclaimer, the term of this patent is extended or adjusted under 35 U.S.C. 154(b) by 580 days.

(21) Appl. No.: 09/735,920

(22) Filed: Dec. 14, 2000

(65) Prior Publication Data

US 2002/0051576 A1 May 2, 2002

(30) Foreign Application Priority Data

Nov. 2, 2000 (KR) ........................... 2000-64956

(51) Int. Cl.$^7$ ................................ G06K 9/54
(52) U.S. Cl. .................. 382/305; 382/190; 382/209; 358/403; 707/6
(58) Field of Search ................ 382/173, 181, 382/190, 209, 217, 218, 220, 305, 403; 707/1–10

(56) References Cited

U.S. PATENT DOCUMENTS

| 5,579,471 A | * | 11/1996 | Barber et al. ............... 345/700 |
| 5,717,940 A | * | 2/1998 | Peairs ........................ 715/515 |
| 5,802,361 A | * | 9/1998 | Wang et al. ................ 382/217 |
| 6,507,841 B2 | * | 1/2003 | Riverieulx de Varax ....... 707/5 |

OTHER PUBLICATIONS

Low, et al. "Colour–based relevance feedback for image retrieval", IEEE, pp. 1–8, Aug. 1998.*

Benitez, et al. "Using relevance feedback in content–based image metasearch", IEEE, pp. 59–69, 1998.*

Fang, et al. "Image retrieval with relevance feedback", IEEE, pp. 85–91, Sep. 2000.*

Doulamis, et al. "Interactive content–based retrieval in video databases using fuzzy classification and relevance feedback", IEEE, pp. 954–958, 1999.*

Rui, et al. "A novel relevance feedback technique in image retrieval", ACM, pp. 67–70, 1999.

Medasani, et al. "A Fuzzy Approach to Content–Based Image Retrieval", IEEE, pp. 1251–1260, Aug. 1999.

IEEE International Conference on Multimedia and Expo 2000, Relevance Feedback for Content–Based Image Retrival Using the Choquet Integral.

* cited by examiner

Primary Examiner—Daniel Mariam
(74) Attorney, Agent, or Firm—Staas & Halsey LLP

(57) ABSTRACT

The invention relates to a content-based image retrieval apparatus and method via relevance feedback by using fuzzy integral and a computer readable record medium storing programs for realizing the apparatus and method. According to the invention, it is provided a content-based image retrieval apparatus and method in which image features are associated by using fuzzy integral and parameters necessary for the fuzzy integral are adjusted in similarity calculations via relevance feedback so as to improve search results. The method comprises the steps of: measuring similarities according to feature between images stored in a database and a new query image; associating the similarities measured according to feature by using the fuzzy integral to measure similarities according to the fuzzy integral; bringing images sequentially in the order of higher similarity according to the finally obtained similarities and transmitting a search result; and recalculating similarities according to feature via relevance feedback about the query result to output converted images.

8 Claims, 4 Drawing Sheets

CONTENT-BASED IMAGE RETRIEVAL APPARATUS AND METHOD VIA RELEVANCE FEEDBACK BY USING FUZZY INTEGRAL

FIELD OF THE INVENTION

The invention relates to a content-based image retrieval apparatus and method via relevance feedback by using fuzzy integral and a computer readable record medium storing programs for realizing the apparatus and method; and, in more particular, to a content-based image retrieval apparatus and method in which image features are associated by using fuzzy integral and parameters necessary for the fuzzy integral are adjusted in similarity calculations via relevance feedback so as to improve search results and a record medium recorded with programs which can be read by a computer for realizing the method.

In other words, the invention relates to a content-based image retrieval apparatus and method via relevance feedback by using fuzzy integral for providing an improved search result over first search result via relevance feedback about the first search result (namely, user opinion if each search result is a desired one) which is outputted according to a user query in a content-based image retrieval system by using various image features including color, texture, shape, etc., and a computer readable record medium storing programs for realizing the method.

DESCRIPTION OF THE RELATED ART

A content-based image retrieval apparatus extracts features from a query image and database images (namely, images in a database), calculates similarities based on a similarity measuring method between the defined image features, and then displays the database images sequentially in the order of higher similarity to the query image.

In general, retrieval methods by associating image features provide better search results over retrieval methods by using only one image feature. Therefore, a weight averaging has been primarily used in which weights are added according to the importance of each feature in order to search image features by association.

However, in the weight averaging of the prior art, common users could not correctly adjust weights and modeling various query forms was difficult. For example, a query such as "Search images similar to the given image by using 3 random features out of 5 features," cannot be processed via the weight averaging, since it is unknown how to select and apply 3 features to similarity measuring.

Furthermore, the weight averaging does not consider interactions among the image features. Namely, similarities are associated linearly on the assumption that each image feature is independent of one another. However, each image is not independent of one another so that interactions among the features should be considered. For example, when two features have a large value of relatedness between them, the weight about these features should be smaller than sum of all weights. Also, some features can have varied weights if other features are present.

Therefore, in the present content-based image retrieval techniques, a novel method is required in which image similarities are associated by using the fuzzy integral and parameters necessary for fuzzy integral are adjusted via relevance feedback to calculate similarities so that various relevance feedbacks can be processed which cannot have been expressed in the conventional weight adjustment.

SUMMARY OF THE INVENTION

Therefore, it is an object of the invention to provide a content-based image retrieval apparatus and method for associating image features by using fuzzy measurement and fuzzy integral and automatically calculating the importance about the image features via relevance feedback to improve a search result, and a record medium recorded with programs which can be read by a computer for realizing the method.

In accordance with an aspect of the present invention, there is provided a content-based image retrieval apparatus via relevance feedback by using fuzzy integral, comprising: image input unit for receiving images from a user; feature extraction unit for extracting image features necessary for image similarity operation from the images inputted via the image input means; first storage unit for storing the image features extracted by the feature extraction unit; thumb nail generator for dividing the images inputted via the image input means to generate thumb nails; second storage unit for storing the thumb nails generated by the thumb nail generator; similarity calculator for calculating the similarities between a selective query image and database images according to feature by using the image features of the first storage unit; similarity measuring unit for associating the similarities calculated via the similarity calculator by using the fuzzy integral to measure final image similarities; query processing unit for interpreting the query from the user to measure similarities, and for sequentially calling and transmitting the images via the second storage unit according to the calculated similarities; and user interface for performing relevance feedback about the image data transmitted from the query processing unit, and for transmitting selective information according to relevance feedback to the query processing unit.

In accordance with another aspect of the present invention, there is provided a content-based image retrieval method via relevance feedback by using fuzzy integral, comprising the steps of: measuring similarities according to feature between images stored in a database and a new query image; associating the similarities measured according to feature by using the fuzzy integral to measure similarities according to the fuzzy integral; bringing images sequentially in the order of higher similarity according to the finally obtained similarities and transmitting a search result; and recalculating similarities according to feature via relevance feedback about the query result to output converted images.

In accordance with further another aspect of the present invention, there is provided a computer readable record medium storing programs for executing a content-based image retrieval method, the method comprising the steps of: measuring similarities according to feature between images stored in a database and a new query image; associating the similarities measured according to feature by using the fuzzy integral to measure similarities according to fuzzy integral; bringing images sequentially in the order of higher similarity according to the finally obtained similarities and transmitting a search result; and recalculating similarities according to feature via relevance feedback about the query result to output converted images.

According to the invention, various features such as color, texture and shape are generally extracted from the images and a similarity measuring method is defined for measuring similarities among these features for a content-based image retrieval. When a user query is inputted, a result is displayed to the user in the order of higher similarity according to the defined similarity measuring method. Here, measuring similarities by associating various features can generally obtain a better result than those obtained by using one feature, and adjusting weights about each feature can enable relevance feedback. However, simple weight adjustment itself has a limitation for processing various queries intended by the user. Therefore, in the invention, the fuzzy integral is used in associating these features, and parameters necessary for the fuzzy integral are adjusted to calculate similarity via relevance feedback so that various relevance feedbacks can be realized which cannot have been expressed in the conventional weight adjustment.

In other words, the invention adopts the fuzzy integral which is one of those methods for associating various image features in a content-based image retrieval apparatus. The fuzzy integral is defined about fuzzy measurement, which indicates importance about all power set of a variable set $\{x_1, \ldots, x_n\}$ which is subjected to measurement. Here, n is the total number of variables to be measured, and the number of the variables necessary for indicating fuzzy measurement is $2^n$. Sum of the fuzzy measurement $g(\{x_1\})$ and $g(\{x_2\})$ can be different from the fuzzy measurement $g(\{x_1, x_2\})$. In other words, the fuzzy measurement is defined by considering interactions between the variables. The fuzzy integral may be same as the conventional weight averaging method if the fuzzy measurement has additive features.

Therefore, in the invention, the fuzzy measurement and Choquet integral as one form of the fuzzy integral are used to associate image similarities, and the fuzzy measurement via relevance feedback or automatic calculation of importance about image features is performed to improve search results. In other words, automatic calculation of the fuzzy measurement via relevance feedback is same as studying correlation between the image features. The invention is characterized in that the fuzzy measurement is studied by considering that major part of the image retrieval is performed on-line and amount of study sample via relevance feedback is few.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Hereinafter, a preferred embodiment of the invention will be described in detail in reference to the appended drawings.

Figure 1:
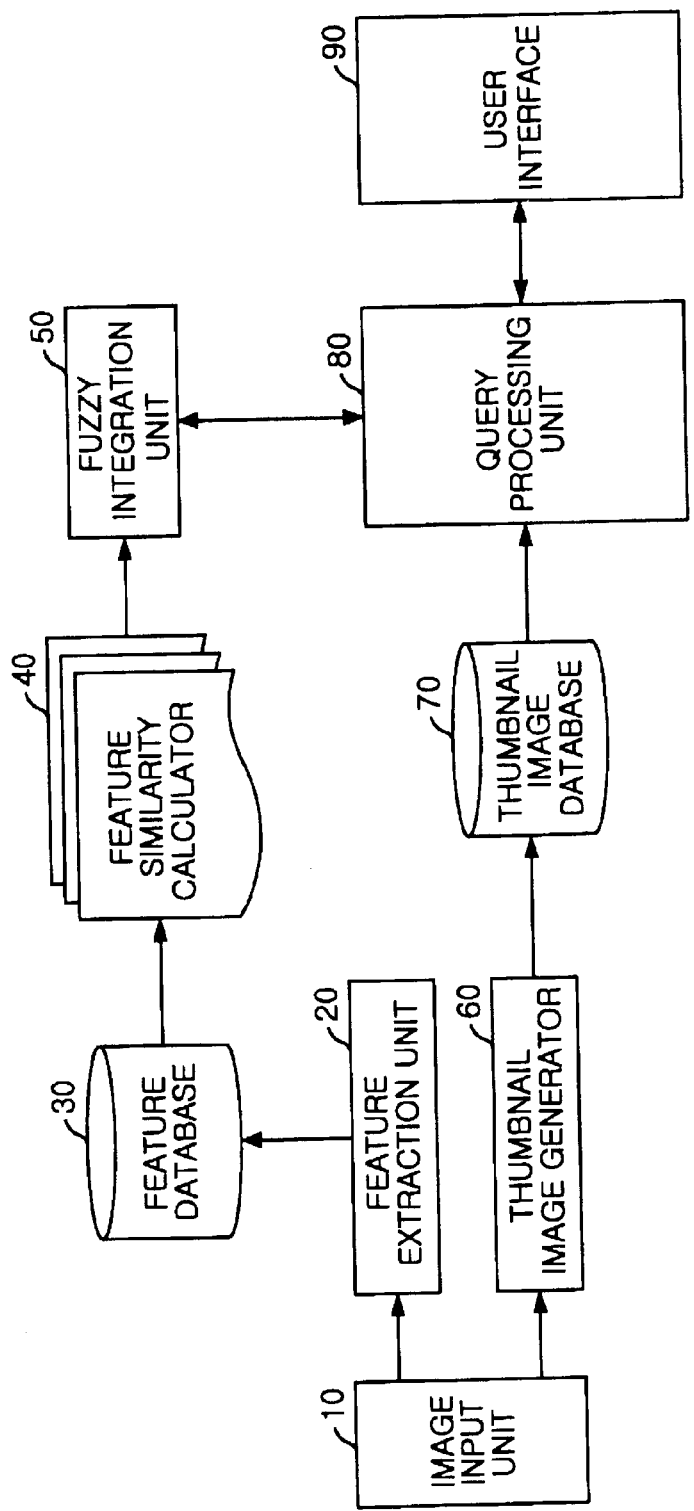
FIG. 1 shows the construction of a content-based image retrieval apparatus via relevance feedback by using fuzzy integral according to an embodiment of the invention.

FIG. 1 shows the construction of a content-based image retrieval apparatus via relevance feedback by using fuzzy integral according to an embodiment of the invention.

As shown in FIG. 1, a content-based image retrieval apparatus via relevance feedback by using the fuzzy integral includes an input image unit 10, a feature extraction unit 20, a feature database 30, feature similarity calculators 40, a fuzzy integration unit 50, a thumbnail image generator 60, a thumbnail image database 70, a query processing unit 70 and a user interface 90.

The image input unit 10 receives images from a user for automation of all processes for inputting images subjected to process to a database. The feature extraction unit 20 extracts features such as color, texture and shape necessary for image similarity measurement from images inputted via the image input unit 10. The feature database 30 efficiently stores and manages the features extracted via the feature extraction unit 20. The feature similarity calculators 40 calculate similarities between database images and the selected query image according to feature by referring to the feature database 30. The fuzzy integration unit 50 associates the feature similarities obtained via the feature similarity calculators 40 by using the fuzzy integral to measure final image similarities. The thumbnail image generator 60 reduces the images obtained from the image input unit 10 for easy search by the user. The thumbnail image database 70 stores the thumbnail images transmitted via the thumbnail image generator 60. The query processing unit 80 performs interactions with the user and the image retrieval apparatus, which interprets a user query in the leading end of the image retrieval apparatus and activates the feature similarity calculators 40 and the fuzzy integration unit 50 to measure the similarities, and sequentially brings and transmits the thumbnail images via the thumbnail database 70 according to the measured similarities. The user interface 90 displays image data transmitted from the query processing unit 80 so that the user can easily recognize and for transmitting the query from the user to the query processing unit 80.

Here, after generating file identifiers as information necessary for processing the images into the database and restoring compressed files, the image input unit 10 activates the feature extraction unit 20 and the thumbnail image generator 60, in which the thumbnail image means a smaller image about 100×100 reduced from a larger one for easy display on the screen.

Also, the user interface 90 displays an image wanted by the user for relevance feedback. In other words, "0" is displayed if the image is desired one by the user, "X" is displayed if not, and "-" is displayed if ambiguous in the query processing unit 80.

In turn, the query processing unit 80 and the user interface 90 can be connected via a network such as Internet or performed in the same computer.

Figure 2:
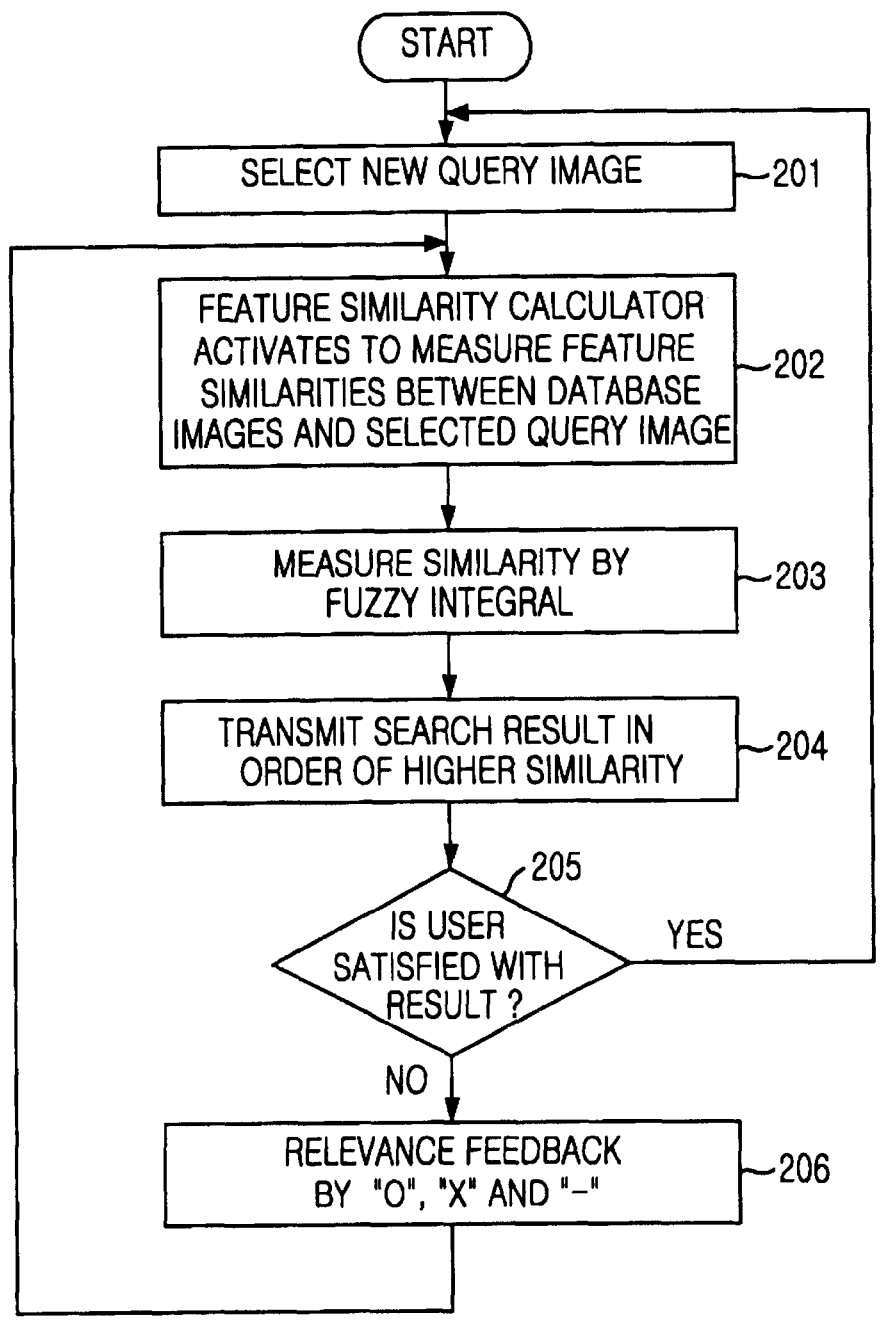
FIG. 2 is a flowchart of a content-based image retrieval method via relevance feedback by using fuzzy integral according to the invention.

FIG. 2 is a flowchart of a content-based image retrieval method via relevance feedback by using the fuzzy integral according to the invention.

As shown in FIG. 2, the user selects a new query image at step 201, then the query processing unit 80 activates each of the feature similarity calculators 40 to measure similarities between the database images and the selected query image according to feature at step 202.

The fuzzy integration unit 50 is activated so that the similarities measured via the feature similarity calculators 40 can be associated by using the fuzzy integral so as to measure final similarities at step 203, then the thumbnail images are brought from the thumbnail database 70 in the order of higher similarity according to the finally obtained similarities and the search result is transmitted to the user at step 204.

After that, it is confirmed if the user is satisfied with the result at step 205. If satisfied, the step 201 is processed for selecting a new query image so that a new image search starts. If not satisfied, the relevance feedback is processed via the "0", "X" and "-" displaying method at step 206. Then, the step 202 of activating the feature similarity calculators 40 is processed again to measure similarities between the query image and the database images so that a requery can be made.

In other words, in the requery accompanying relevance feedback, study method for obtaining new fuzzy measurement in the fuzzy integral is activated to perform the fuzzy integral by new fuzzy measurement by activating for relevance feedback.

Now, the aforementioned process of the fuzzy measurement will be described in more detail.

First, the fuzzy measurement will be defined as follows:
If set X $\{x_1, \ldots, x_n\}$ is a finite set and P(X) is a power set, a function
g: P(X)→[0, 1] is referred to the fuzzy measurement which satisfies the following two conditions:
(i) g(∅)=0, g(X)=1, and
(ii) If A, B⊂X and A⊂B, then g(A)≦g(B).

Herein, the fuzzy measurement g(.) needs $2^n$ number of coefficients, and g(A) value indicates the importance of subset A. The condition (ii) indicates monotonicity. The fuzzy measurement can be expressed in a diagram as in FIG. 3.

Set S=$\{s_1, \ldots, s_n\}$ is defined as a set of similarity measurement functions between two images according to X=$\{x_1, \ldots, x_n\}$. Herein, $s_k(.)$ is a similarity measurement function according to feature $x_k$. In turn, $x_{ik}$ and $x_{jk}$ are defined as kth features of query images i and j. Herein, n is the total number of the used image features. For example, color histogram or wavelet coefficients can be included in the features.

Image similarity association according to Choquet integral using the aforementioned the fuzzy measurement function g and similarity measurement s can be expressed in equation 1:

$$C_g(S, i, j)=_{k=1, \ldots, n}[S_{(k)}(x_{i(k)}, x_{j(k)})-S_{(k-1)}(x_{i(k-1)}, x_{j(k-1)})g(A_{(k)})] \quad \text{equation 1}$$

Herein, $0 \leq s_{(1)}(x_{i(1)}, x_{j(1)}) \leq \ldots \leq s_{(n)}(x_{i(n)}, x_{j(n)}) \leq 1$, and $A_{(i)}=\{x_{(i)}, \ldots, x_{(n)}\}$, here i=1, ..., n. g(.) means the fuzzy measurement and is defined about $A_{(i)}$. $g(A_{(0)})$ means 0. Brackets ( ) mean order, which is defined in ascending order of the similarity measurement values between two images. For example, when X is {color, texture, shape}, $\{s_1, s_2, s_3\}$ is a set of similarity measurement functions and a similarity measurement result between the images i and j according to feature is $s_2 \leq s_1 \leq s_3$, then $s_{(1)}(x_{i(1)}, x_{j(1)})=s_2, s_{(2)}(x_{i(2)}, x_{j(2)})=s_1, s_{(3)}(x_{i(3)}, x_{j(3)})=s_3$, and $A_{(0)}=∅, A_{(1)}=\{x_2\}, A_{(2)}=\{x_2, x_1\}, A_{(3)}=\{x_2, x_1, x_3\}$. Hereinafter $g(\{x_k\})$ will be expressed as $g_k$.

The foregoing method of relevance feedback by using the fuzzy integral and the fuzzy measurement will be described in detail as follows.

A related image set after relevance feedback is referred to $R^+$, and unrelated image set is $R^-$. Improving search result via relevance feedback is same as studying the fuzzy measurement via the foregoing two sets. In other words, when the fuzzy measurement is adjusted so that similarities to the image i belonging to $R^+$ is increased and similarities to the image j belonging to $R^-$ is decreased about the given query image q, images having properties similar to an image belonging to $R^+$ are more detected and images having properties similar to another image belonging to $R^-$ are less detected.

The fuzzy measurement is adjusted so that it can be minimized as expressed in equation 2:

$$J(g)=\Sigma_{i \in R^+}[C_g(S, q, i)-s_{(n)}(x_{q(n)}, x_{i(n)})]^2+\Sigma_{i \in R^-}[C_g(S, q, j)-s_{(1)}(x_{q(1)}, x_{j(1)})]^2 \quad \text{equation 2}$$

Herein, $S_{(n)}(x_{q(n)}, x_{i(n)})$ is the maximum of the similarities $\{s_1(.), \ldots, s_n(.)\}$ according to feature between the image i belonging to $R^+$ and the query image q, and $s_{(1)}(x_{q(1)}, x_{j(1)})$ is the minimum of the similarities between the image j belonging to $R^-$ and the query image q.

However, it is very troublesome to obtain g for minimizing equation 2 while satisfying the fuzzy measurement condition (ii) since a gradient descent method cannot be applied simply. Even though some methods have been proposed to solve these problems in a pattern recognition field, they are difficult for relevance feedback since study data given by a user is generally very few, so g may not be updated in much more amount than in the pattern recognition appliance. Therefore, a problem takes place in generalization of study results. This causes rather worse result than the study is performed. Also, the study should be performed on-line so that a study algorithm inevitably has difficulties of improving study speed. Therefore, the invention is proposed to solve these problems so that relevance feedback can be performed by using the fuzzy integral, which is a much more productive association method than the weight averaging.

The fuzzy measurement of the invention comprises the following two stages:

First stage is about individual feature importance study in which a representative similarity is obtained between the query image q and the image i belonging to $R^+$ about each feature $x_k$. Here, the representative similarity can be the average $ps_k$. Also, a representative similarity is obtained between the query image q and the image j belonging to $R^-$. Herein, the representative similarity can be the average $ns_k$.

In this manner, a representative similarity difference is obtained about each feature $x_k$. Here, when the representative similarity is the average similarity, the average representative similarity difference $\Delta s_k$ is obtained as in equation 3:

$$\Delta s_k = ps_k - ns_k,$$

$$ps_k = 1/n \Sigma_{i \in R^+} s_k(x_{ik}, x_{qk}),$$

$$ns_k = 1/n \Sigma_{i \in R^-} s_k(x_{ik}, x_{qk}) \quad \text{equation 3}$$

Hereinafter, the representative similarity is assumed as the average similarity, which can be obtained in various ways such as median.

Herein, if $\Delta s_k$ is positive, the query image is relatively more similar to the image belonging to $R^+$ than the image belonging to R– about the feature $x_k$ corresponding to it so that importance about $x_k$ or the fuzzy measurement $g_k$ increases for relevance feedback.

On the contrary, if $\Delta s_k$ is negative, the query image is more relatively similar to the image belonging to $R^-$ than the image belonging to $R^+$ so that importance about $x_k$ or the fuzzy measurement $g_k$ decreases for relevance feedback.

Finally, if $\Delta s_k$ is near "0", judgment is difficult so that $g_k$ is maintained as the original value without changing. Here, if the user does not indicate $R^+$ ($R^-$), an image set which is not indicated from those currently displayed to the user is considered $R^-$ ($R^+$) in calculation.

Rules of these linguistic expressions can be processed by a fuzzy rule based system. The foregoing explanations can be expressed in equation 4:

If $\Delta \underline{s}_k$ is positive, then $g_k=1$,

Else if $\Delta \underline{s}_k$ is negative, then $g_k=0$, and

Else if $\Delta \underline{s}_k$ is zero, then $g_k=g_k$  equation 4

Also, final fuzzy measurement obtained by using the foregoing equation 3 is expressed as in equation 5:

$$g_k=(p(\Delta \underline{s}_k)*1.0+n(\Delta \underline{s}_k)*0.0+g_k*z(\Delta \underline{s}_k))/(p(\Delta \underline{s}_k)+n(\Delta \underline{s}_k)+z(\Delta \underline{s}_k))=$$

$$(p(\Delta \underline{s}_k)+g_k*z(\Delta \underline{s}_k))/(p(\Delta \underline{s}_k)+n(\Delta \underline{s}_k)+z(\Delta \underline{s}_k)) \quad \text{equation 5}$$

Herein, $p(\Delta \underline{s}_k)$ is a membership representing the degree that $\Delta \underline{s}_k$ belongs to fuzzy set positive, $n(\Delta \underline{s}_k)$ is a membership representing the degree that $\Delta \underline{s}_k$ belongs to fuzzy set negative, and $z(\Delta \underline{s}_k)$ is a membership representing the degree that $\Delta \underline{s}_k$ belongs to fuzzy set zero.

The fuzzy set positive, negative and zero are defined between $-1$ to $1$ which are range of $\Delta \underline{s}_k$, and can be defined by a membership function.

Importance about each feature or fuzzy measurement should be obtained by considering interactions between the features. In the initializing operation as the foregoing first stage, the fuzzy measurement is assumed to have additive properties and obtained about subsets of all features by using the additive properties, where the method is expressed in the foregoing equation 5.

Also, the fuzzy measurement about all subset of the feature set can be obtained as in equation 6:

$$g(\{x_i, x_j\})=g(\{x_i\})+g(\{x_j\}) \quad \text{equation 6}$$

Second stage is about a feature interaction study in which the importance about each feature is obtained by using the fuzzy rules of the foregoing first stage. In the second stage of the invention, a method of obtaining correlation of the features which is an advantage of the fuzzy measurement is as follows:

Step 1: Error values are obtained for each sample. That is:
$E_p = C_g(S, q, p) - s_{(n)}(x_{q(n)}, x_{p(n)})$ if $p \in R^+$, and
$E_p = C_g(S, q, p) - s_{(1)}(x_{q(1)}, x_{p(1)})$ if $p \in R^-$.

Herein, g uses the fuzzy measurement method obtained via the foregoing first stage study process.

Step 2: Variation value is obtained as follows about the fuzzy measurement g about corresponding sample:

$\Delta g(A_{(k)}) = \eta E[s_{(k)}(x_{q(k)}, x_{p(k)}) - s_{(k-1)}(x_{q(k-1)}, x_{p(k-1)})]$, $k=1, \ldots, n$.

Herein, $\eta$ is learning rate.

Step 3: After steps 1 and 2 are calculated about all samples, the fuzzy measurement g is updated as follows:

$g(A_{(k)}) = g(A_{(k)}) + \Delta g(A_{(k)})$.

Figure 3:
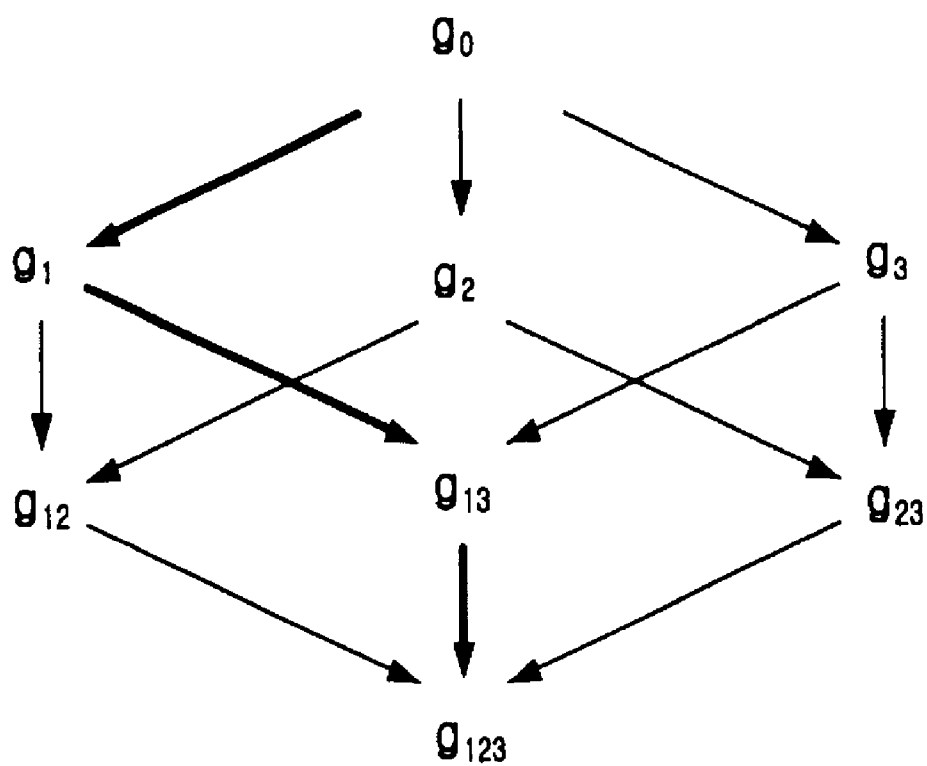
FIG. 3 is a diagram for showing the lattice structure of a fuzzy measurement coefficient in a content-based image retrieval apparatus according to the invention.

Step 4: An operation for satisfying monotonicity as the condition (ii) about each fuzzy measurement g is performed as follows:

Starting from the highest level of FIG. 3, if g≦max Upper(g), it is changed to g=max Upper(g), else it is maintained. This operation is performed until the lowest level. Herein, Upper(g) is a set of the fuzzy measurement values in the parent node of g in FIG. 3.

Step 5: If total error values are $E=\Sigma_{p \subset R+, R-} E_p < \epsilon$ or $\Delta E < \delta$, it is terminated. Else, after $\eta$ is reduced, it is processed to the step 1. Herein $\epsilon$ and $\delta$ are critical values and $\eta$ uses a decreasing function according to time.

Figure 4:
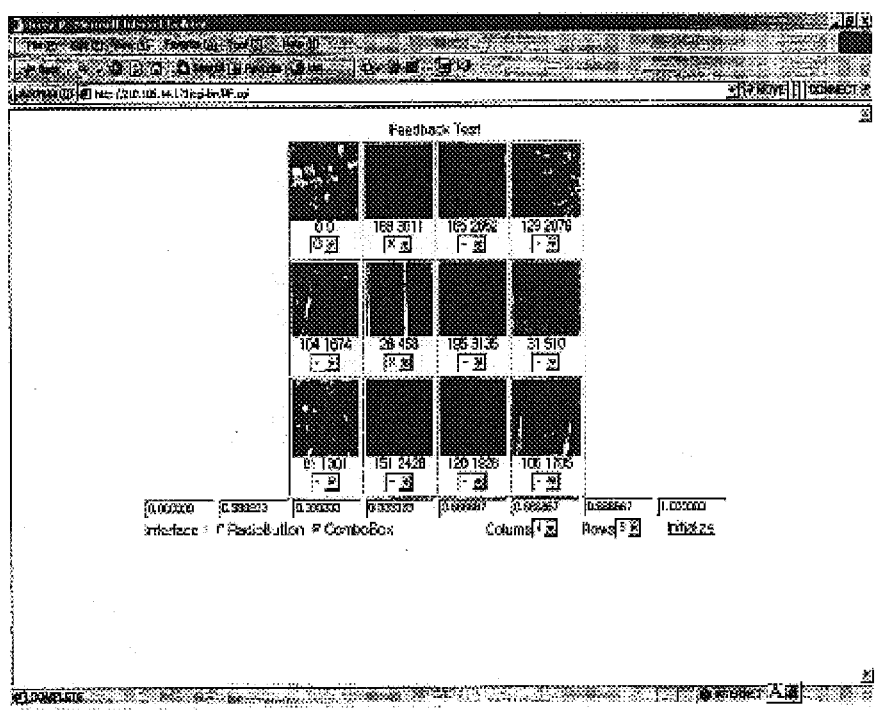
FIG. 4 shows an example of a user interface in a content-based image retrieval apparatus according to the invention.

FIG. 4 shows an example of a user interface in a content-based image retrieval apparatus according to the invention.

As shown in FIG. 4, the user can select a query image from random images displayed by the query processing unit 80, draw the query image by him/herself, or use image data accepted from an external image device such as digital camera.

In turn, for relevance feedback, when the image displayed by the query processing unit 80 is a desired one, "0" is marked. Else, "X" is marked. If ambiguous, "-" is marked.

As described hereinabove according to the invention, Choquet integral is used in processing interactions between the features which cannot be provided by the weight averaging in relevance feedback for content-based image search so that recognizable similarity reference between images can be reflected and thus the user can obtain better search results.

Also, the invention can be applied to web image search services via a web server and for establishing image database independently in a personal computer.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A content-based image retrieval apparatus via relevance feedback by using fuzzy integral, the apparatus comprising:

image input means for receiving images from a user;

feature extraction means for extracting image features necessary for image similarity operation from the images inputted via said image input means;

first storage means for storing the image features extracted by said feature extraction means;

thumb nail generating means for dividing the images inputted via said image input means to generate thumb nails;

second storage means for storing the thumb nails generated by said thumb nail generating means;

similarity calculation means for calculating similarities between a query image and the images based on the image features stored on said first storage means, to thereby generate individual similarities for each image feature;

similarity measuring means for performing fuzzy integral of the individual similarities calculated via said similarity calculation means, to thereby measure final image similarities;

query processing means for interpreting the query image from the user to measure similarities, and for sequentially calling and transmitting the thumb nails stored on said second storage means according to the calculated similarities;

user interface means for performing relevance feedback about the image data transmitted from said query processing means, and for transmitting selective information according to relevance feedback to said query processing means wherein the final image similarities are measured based on an equation as:

$$C_g(S, i, j) = _{k=1, \ldots, n}[S_{(k)}(x_{i(k)}, x_{j(k)}) - S_{(k-1)}(x_{i(k-1)}, x_{j(k-1)})g(A_{(k)}),]$$

where $S=\{s_1, \ldots, s_n\}$ is a set of similarity measurement functions between two images, $X=\{x_1, \ldots, x_n\}$ is a set of image features, $x_{i(k)}$ and $x_{j(k)}$ are $k^{th}$ image features of query images i and j, n is the total number of used image features, $g(A_{(k)})$, which is also expressed as $g_k$, denotes relevance of a feature subset $A_{(k)}=\{x_1, \ldots, x_{(k)}\}$, and $0 \leq s_{(1)}(x_{i(1)}, x_{j(1)}) \leq \ldots \leq s_{(n)}(x_{i(n)}, x_{j(n)}) \leq 1$.

2. The apparatus as recited in claim 1, wherein the fuzzy integral is operated by studying and initializing the fuzzy measurement about individual image features and then studying special interactions to perform the fuzzy measurement necessary for fuzzy via relevance feedback.

3. The apparatus as recited in claim 2, wherein the fuzzy studying of the individual features is performed by establishing fuzzy rules based on representative similarity differences and by measuring the fuzzy integral, wherein the fuzzy rules are established based on equations as:

If $\Delta_{\underline{s}_k}$ is positive, then $g_k=1$

Else if $\Delta_{\underline{s}_k}$ is negative, then $g_k=0$, and

Else if $\Delta_{\underline{s}_k}$ is zero, then $g_k=g_k$;

$\Delta s_k$ is a difference between $ps_k$ and $ns_k$ for the kth image feature $x_k$, $ps_k$ is an average similarity of the query image q and the image i belonging to a related image set $R^+$, $ns_k$ is an average similarity of the query image q and the image j belonging to an unrelated image set $R^-$, wherein the fuzzy integral is measured based on an equation as:

$$g_k=(p(\Delta_{\underline{s}_k})*1.0+n(\Delta_{\underline{s}_k})*0.0+g_k*z(\Delta_{\underline{s}_k}))/(p(\Delta_{\underline{s}_k})+n(\Delta_{\underline{s}_k})+z(\Delta_{\underline{s}_k}))=$$
$$(p(\Delta_{\underline{s}_k})+g_k*z(\Delta_{\underline{s}_k}))/(p(\Delta_{\underline{s}_k})+n(\Delta_{\underline{s}_k})+z(\Delta_{\underline{s}_k}))$$

where ($p(\Delta_{\underline{s}_k})$ is a membership representing the degree that $\Delta_{\underline{s}_k}$ belongs to the fuzzy set positive, $n(\Delta_{\underline{s}_k})$ is a membership representing the degree that $\Delta_{\underline{s}_k}$ belongs to the fuzzy set negative, and $z(\Delta_{\underline{s}_k})$ is a membership representing the degree that $\Delta_{\underline{s}_k}$ belongs to the fuzzy set zero.

4. The apparatus as recited in claim 2, wherein the studying of the special interactions is performed by obtaining the fuzzy measurement whereby the following equation is minimized, and studying while satisfying monotonicity which is a fuzzy measurement condition, wherein the equation is:

$$J(g)=\Sigma_{i \in R+}[Cg(S, q, i)-s_{(n)}(x_{q(n)}, x_{i(n)})]^2+\Sigma_{i \in R-}[Cg(S, q, j)-s_{(1)}(x_{q(1)}, x_{j(1)})]^2$$

where $s_{(n)}(x_{q(n)}, x_{i(n)})$ is the maximum of the similarities $s_1(.), \ldots, s_n(.)$ according to feature between the image i which belongs to $R^+$ and the query image q, and $s_{(1)}(x_{q(1)}, x_{j(1)})$ is the minimum of the similarities between the image j which belongs to $R^-$ and the query image q.

5. A content-based image retrieval method via relevance feedback by using fuzzy integral, comprising:

measuring similarities according to feature between images stored in a database and a new query image;

associating the similarities measured according to feature by using the fuzzy integral to measure similarities according to the fuzzy integral;

bringing images sequentially in the order of higher similarity according to the finally obtained similarities and transmitting a search result; and recalculating similarities according to feature via relevance feedback about the query result to output converted images wherein the final image similarities are measured based on an equation as:

$$C_g(S, i, j)=_{k=1, \ldots, n}[S_{(k)}(x_{i(k)}, x_{j(k)})-S_{(k-1)}(x_{i(k-1)}, x_{j(k-1)})g(A_{(k)})]$$

where $S=\{s_1, \ldots, s_n\}$ is a set of similarity measurement functions between two images, $X=\{x_1, \ldots x_n\}$ is a set of image features, $x_{i(k)}$ and $x_{j(k)}$ are $k^{th}$ image features of query images i and j, n is a total number of used image features, $g(A_{(k)})$, which is also expressed as $g_k$, denotes relevance of a feature subset $A_{(k)}=\{x_{(1)}, \ldots, x_{(k)}\}$, and $0 \leq s_{(1)}(x_{i(1)}, x_{j(1)}) \leq \ldots \leq s_{(n)}(x_{i(n)}, x_{j(n)}) \leq 1$.

6. The method as recited in claim 5, wherein the fuzzy integral is operated by studying and initializing the fuzzy measurement about individual features and then studying special interactions to perform the fuzzy measurement necessary for fuzzy via relevance feedback.

7. The method as recited in claim 6, wherein the fuzzy studying of the individual features is performed by establishing fuzzy rules based on representative similarity differences and by measuring the fuzzy integral, wherein the fuzzy rules are established based on equations as:

If $\Delta_{\underline{s}_k}$ is positive, then $g_k=1$,

Else if $\Delta_{\underline{s}_k}$ is negative, then $g_k=0$, and

Else if $\Delta_{\underline{s}_k}$ is zero, then $g_k=g_k$; and $\Delta s_k$ is a difference between $ps_k$ and $ns_k$ for the kth image feature $x_k$, $ps_k$ is an average similarity of the query image g and the image i belonging to a related image set $R^+$, $ns_k$ is an average similarity of the query image q and the image j belonging to an unrelated image set $R^-$, wherein the fuzzy integral is measured based on an equation as:

$$g_k=(p(\Delta_{\underline{s}_k})*1.0+n(\Delta_{\underline{s}_k})*0.0+g_k*z(\Delta_{\underline{s}_k}))/(p(\Delta_{\underline{s}_k})+n(\Delta_{\underline{s}_k})+z(\Delta_{\underline{s}_k}))=$$
$$(p(\Delta_{\underline{s}_k})+g_k*z(\Delta_{\underline{s}_k}))/(p(\Delta_{\underline{s}_k})+n(\Delta_{\underline{s}_k})+z(\Delta_{\underline{s}_k}))$$

where ($p(\Delta_{\underline{s}_k})$ is a membership representing the degree that $\Delta_{\underline{s}_k}$ belongs to the fuzzy set positive, $n(\Delta_{\underline{s}_k})$ is a membership representing the degree that $\Delta_{\underline{s}_k}$ belongs to the fuzzy set negative, and $z(\Delta_{\underline{s}_k})$ is a membership representing the degree that $\Delta_{\underline{s}_k}$ belongs to the fuzzy set zero.

8. A computer readable record medium storing instructions for executing a content-based image retrieval method, comprising:

measuring similarities according to feature between images stored in a database and a new query image;

associating the similarities measured according to feature by using the fuzzy integral to measure similarities according to the fuzzy integral;

bringing images sequentially in the order of higher similarity according to the finally obtained similarities and transmitting a search result; and recalculating similarities according to feature via relevance feedback about the query result to output converted images wherein the final image similarities are measured based on an equation as:

$$C_g(S, i, j) = \sum_{k=1,\ldots,n} [S_{(k)}(x_{i(k)}, x_{j(k)}) - S_{(k-1)}(x_{i(k-1)}, x_{j(k-1)}) g(A_{(k)})]$$

where $S = \{s_1, \ldots s_n\}$ is a set of similarity measurement functions between two images, $X = \{x_1, \ldots x_n\}$ is a set of image features, $x_{i(k)}$ and $x_{i(k)}$ are kth image features of query images i and j, n is the total number of the used image features, $g(A_{(k)})$, which is also expressed as $g_k$, denotes relevance of a feature subset $A_{(k)} = \{x_{(1)}, \ldots x_{(k)}\}$ and $0 \leq s_{(1)}(x_{i(1)}, x_{j(1)}) \leq \ldots \leq s_{(n)}(x_{i(n)}, x_{j(n)}) \leq 1$.

* * * * *